(12) United States Patent
Kim

(10) Patent No.: US 6,687,078 B1
(45) Date of Patent: Feb. 3, 2004

(54) DISK DRIVE FOR WRITING MICRO-JOG VALUES ALONG THE CENTERLINE OF A RESERVED TRACK AND FOR WRITING USER DATA OFFSET FROM THE CENTERLINE OF A DATA TRACK

(75) Inventor: Yoo H. Kim, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 318 days.

(21) Appl. No.: 09/797,547

(22) Filed: Feb. 28, 2001

(51) Int. Cl.[7] .............................................. G11B 5/596
(52) U.S. Cl. ................ 360/77.04; 360/77.08; 360/78.04
(58) Field of Search .............................. 360/75, 77.02, 360/77.04, 77.08, 78.04

(56) References Cited

U.S. PATENT DOCUMENTS

| 5,257,149 A | 10/1993 | Meyer |
| 5,587,850 A | 12/1996 | Ton-that |
| 5,771,131 A | 6/1998 | Pirzadeh |
| 5,867,343 A | 2/1999 | Le et al. |
| 5,956,200 A | 9/1999 | Kohno et al. |
| 6,014,283 A | 1/2000 | Codilian et al. |
| 6,049,440 A * | 4/2000 | Shu .......................... 360/77.04 |
| 6,421,197 B1 * | 7/2002 | Abdelnour ............... 360/77.02 |
| 6,510,017 B1 * | 1/2003 | Abdelnour ............... 360/77.04 |

* cited by examiner

*Primary Examiner*—Andrew L. Sniezek
(74) *Attorney, Agent, or Firm*—Milad G. Shara, Esq.; Howard H. Sheerin, Esq.

(57) ABSTRACT

The present invention may be regarded as a disk drive comprising a disk having a plurality of data tracks and at least one reserved track. At least one of the data tracks for recording user data along a circumferential path offset from the centerline of the data track, and the at least one reserved track for recording data track micro-jog values along a circumferential path substantially aligned with the centerline of the reserved track.

4 Claims, 5 Drawing Sheets

US 6,687,078 B1

DISK DRIVE FOR WRITING MICRO-JOG VALUES ALONG THE CENTERLINE OF A RESERVED TRACK AND FOR WRITING USER DATA OFFSET FROM THE CENTERLINE OF A DATA TRACK

BACKGROUND OF THE INVENTION

1. Field of the Invention

The present invention relates to disk drives for computer systems. More particularly, the present invention relates to a disk drive for writing micro-jog values along the centerline of a reserved track and for writing user data offset from the centerline of a data track.

2. Description of the Prior Art

FIG. 1 shows a disk 2 having an exemplary prior art disk format comprising a plurality of concentric tracks 4, where each track 4 comprises a plurality of embedded servo sectors 6. A head is actuated radially over the disk 2 in order to write and read user data along circumferential paths defined by the tracks 4. Each embedded servo sector comprises a preamble field 8 for use in synchronizing timing recovery and gain control circuitry, and a sync mark 10 for use in discerning symbol boundaries of servo data 12. At the end of each servo sector 6 are a plurality of servo bursts 14 (A, B, C, D) which are aligned at predetermined offsets from one another and which define a centerline of the track 4. As the head reads the servo bursts 14, an indication of the head's position relative to the track's centerline is derived and used by a servo control system to maintain the head along the desired circumferential path during write and read operations.

Magneto-resistive (MR) heads comprise a MR read element spaced apart from an inductive write element. Due to the skew angle of the MR head relative to the concentric tracks recorded on the disk, the read element may not align circumferentially with the write element. At very high recording densities (tracks-per-inch (TPI)), the radial offset between the read and write elements may range from a fraction of a track to several tracks depending on the geometries and radial position of the head. When writing data to the disk, the read element is maintained over a centerline of a "read" track while the write element writes data to a "write" track (the read and write tracks may be the same track). Due to the radial offset between the read and write elements, the data may be written along a circumferential path that is offset from the centerline of the write track. During a read operation, the read element is maintained over the circumferential path of the recorded data by introducing an offset value referred to as a "micro-jog" into the servo control loop. The micro-jog corresponds to the offset of the recorded data from the track's centerline.

FIG. 2A shows a prior art disk drive comprising a disk 18 having a plurality of data tracks and at least one reserved track 40. The disk drive 16 further comprises a position error generator 20 for generating a position error signal (PES) 22 in response to the servo bursts 14 recorded in the servo sector 6, and a micro-jog value 24 stored in a semiconductor memory 26. A servo compensator 28 processes the PES 22 to generate a control signal 30 applied to an actuator (VCM) 32 in order to actuate a head 34 radially over the disk 18. The head 34 comprises a read element 36 offset from a write element 38 (e.g., a magnetoresistive head). When writing data to a selected track 40 (data track or reserved track), the head 34 is positioned such that the read element 36 is aligned over the centerline of a read track 42 (using the servo bursts 14) and the write element 38 is aligned over the selected track 40 offset from the selected track's centerline. When reading the recorded data from the selected track 40, the head 34 is positioned such that the read element 36 is aligned over the recorded data (offset from the selected track's centerline) by introducing the micro-jog value 24 into the servo loop. The micro-jog value 24 is selected from the semiconductor memory 26 based on the track number 44 of the selected track.

During manufacture of the disk drive 16, the micro-jog values 24 for each track are typically determined by executing a calibration procedure. A test pattern is written to a selected track and, upon read back, the read signal is evaluated to determine the centerline offset of the recorded data. The micro-jog values 24 (or parameters for calculating the micro-jog values) are recorded in a reserved track 40 (or tracks) on the disk 18. When the disk drive 16 is powered on, the micro-jog values 24 are read from the reserved track(s) 40 and stored in the semi-conductor memory 26.

In order to successfully retrieve the micro-jog values from the reserved track(s) during the power-on sequence, an initial micro-jog value is needed in order to align the read element over the data recorded in the reserved track(s). The initial micro-jog value may be determined during the power-on sequence by reading the reserved track(s) using a nominal micro-jog value. If the read is unsuccessful, the micro-jog value is incrementally modified and another attempt is made to read the reserved track(s). The disk drive iterates this process until the micro-jog value which enables reading the reserved track(s) is discovered. Attempting to read the reserved track(s) by iteratively converging on the correct micro-jog value can significantly increase the duration of the power-on sequence, a problem that is exacerbated by a reserved track(s) recorded with marginal fidelity due, for example, to defects in the recording medium. To recover data recorded in a marginally if recorded track, the disk drive typically executes a retry procedure wherein various parameters (e.g., read channel parameters) are "fine tuned" and the data reread until successfully recovered. When attempting to read a marginally recorded reserved track, the disk drive may need to execute the iterative retry procedure for each iteration of the incrementally modified micro-jog values, potentially requiring numerous revolutions to successfully recover the data recorded in the reserved track. This problem can be avoided by storing the initial micro-jog value(s) in a non-volatile semiconductor memory during manufacture of the disk drive, however, this leads to an undesirable increase in the cost of the disk drive.

Thus, in a disk drive employing a head having a read element offset from a write element, there is a need to minimize the duration of a power-on sequence by minimizing the number of revolutions required to read micro-jog values recorded in reserved track(s).

SUMMARY OF THE INVENTION

The present invention may be regarded as a disk drive comprising a disk having a plurality of data tracks and at least one reserved track. Each of the data tracks and the at least one reserved track comprise a plurality of embedded servo sectors. Each embedded servo sector comprises a plurality of servo bursts which define a centerline of each track. At least one of the data tracks is for recording user data along a circumferential path offset from the centerline of the data track. The at least one reserved track for recording data track micro-jog values along a circumferential path substantially aligned with the centerline of the reserved track. The disk drive further comprising a head having a read element and a write element, wherein the read element is offset from the write element, and an actuator, responsive to a control signal, for actuating the head radially over the disk. A position error generator within the disk drive, responsive to the servo bursts recorded in the embedded servo sectors and the data track micro-jog values recorded in the at least one reserved track, generates a position error signal (PES) representing a position error of the read element with respect to a circumferential path of data recorded in a selected one of the data tracks. A servo compensator, responsive to the PES, generates the control signal applied to the actuator.

In one embodiment, during a power-on sequence the servo compensator generates the control signal to align the read element over the centerline of the reserved track in order to read the data track micro-jog values recorded in the reserved track. When writing user data to a selected one of the data tracks, the servo compensator generates the control signal to align the read element along a centerline of a read track while the write element writes data to the selected data track along a circumferential path that is offset from the centerline of the selected data track. When reading data from the selected data track, the servo compensator uses at least one of the data track micro-jog values corresponding to the selected data track to generate the control signal to align the read element along the circumferential path of the data recorded in the selected data track.

The present invention may also be regarded as a method executed by a disk drive comprising a disk having a plurality of data tracks and at least one reserved track, and a head comprising a read element offset from a write element, wherein the method for recording data track micro-jog values in the reserved track. The method comprises the steps of calibrating a reserved track micro-jog value, seeking the head to the reserved track, using the reserved track micro-jog value to maintain the read element offset from a centerline of a read track in order to maintain the write element over a centerline of the reserved track, and writing the data track micro-jog values to the reserved track substantially along the centerline of the reserved track.

The present invention may also be regarded as a method executed by a disk drive comprising a disk having a plurality of data tracks and at least one reserved track, and a head comprising a read element offset from a write element, wherein the method for reading data track micro-jog values recorded in the reserved track. The method comprises the steps of seeking the head to the reserved track, maintaining the read element over a centerline of the reserved track, reading the data track micro-jog values recorded in the reserved track, and storing the data track micro-jog values in a semiconductor memory.

DESCRIPTION OF THE PREFERRED EMBODIMENTS

Figure 1:
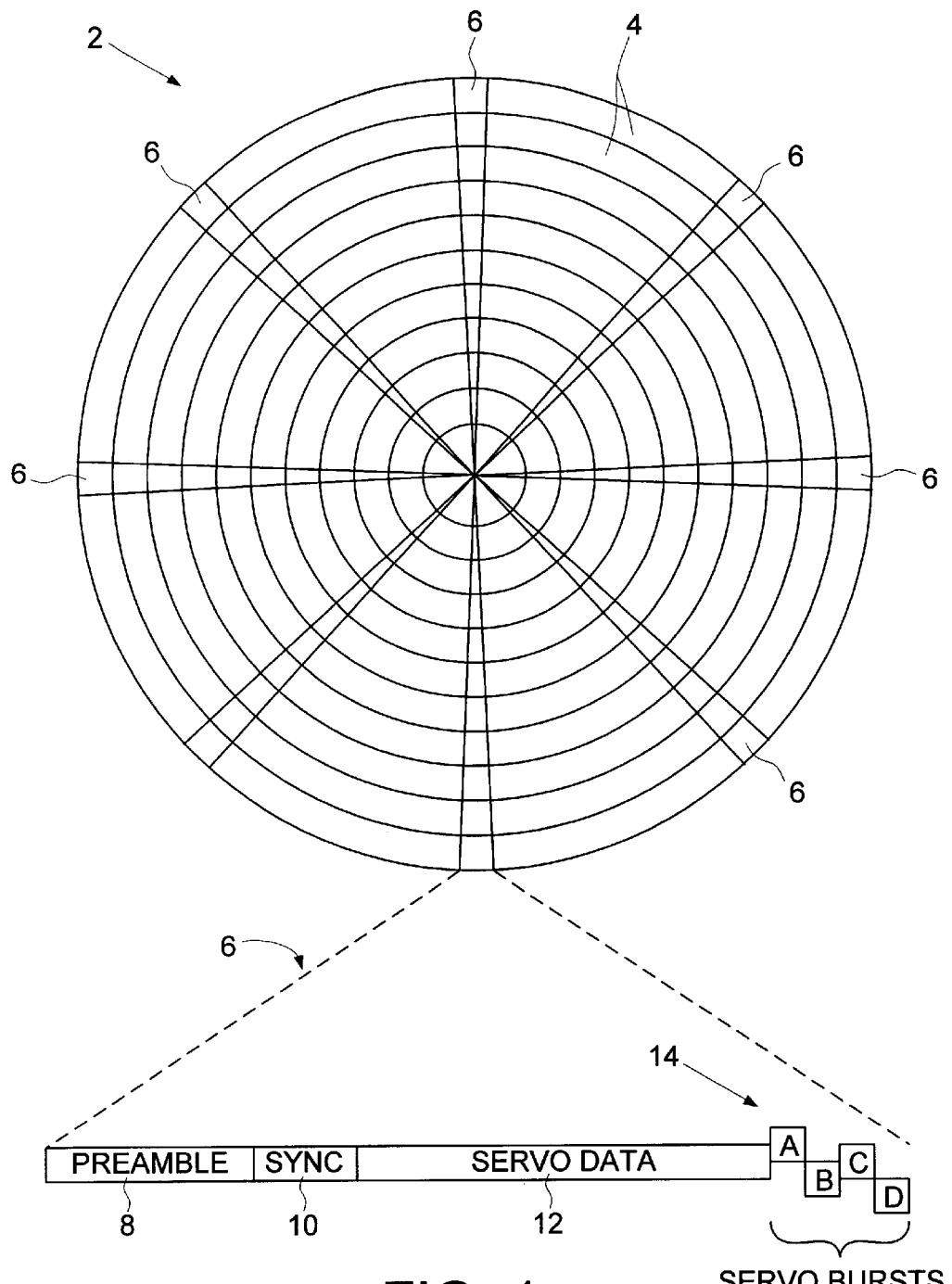
FIG. 1 is a prior art disk format comprising a plurality of concentric tracks, wherein each track comprises a plurality of embedded servo sectors having a plurality of servo bursts recorded at the end of each servo sector which define a centerline of the tracks.
Figure 2A:
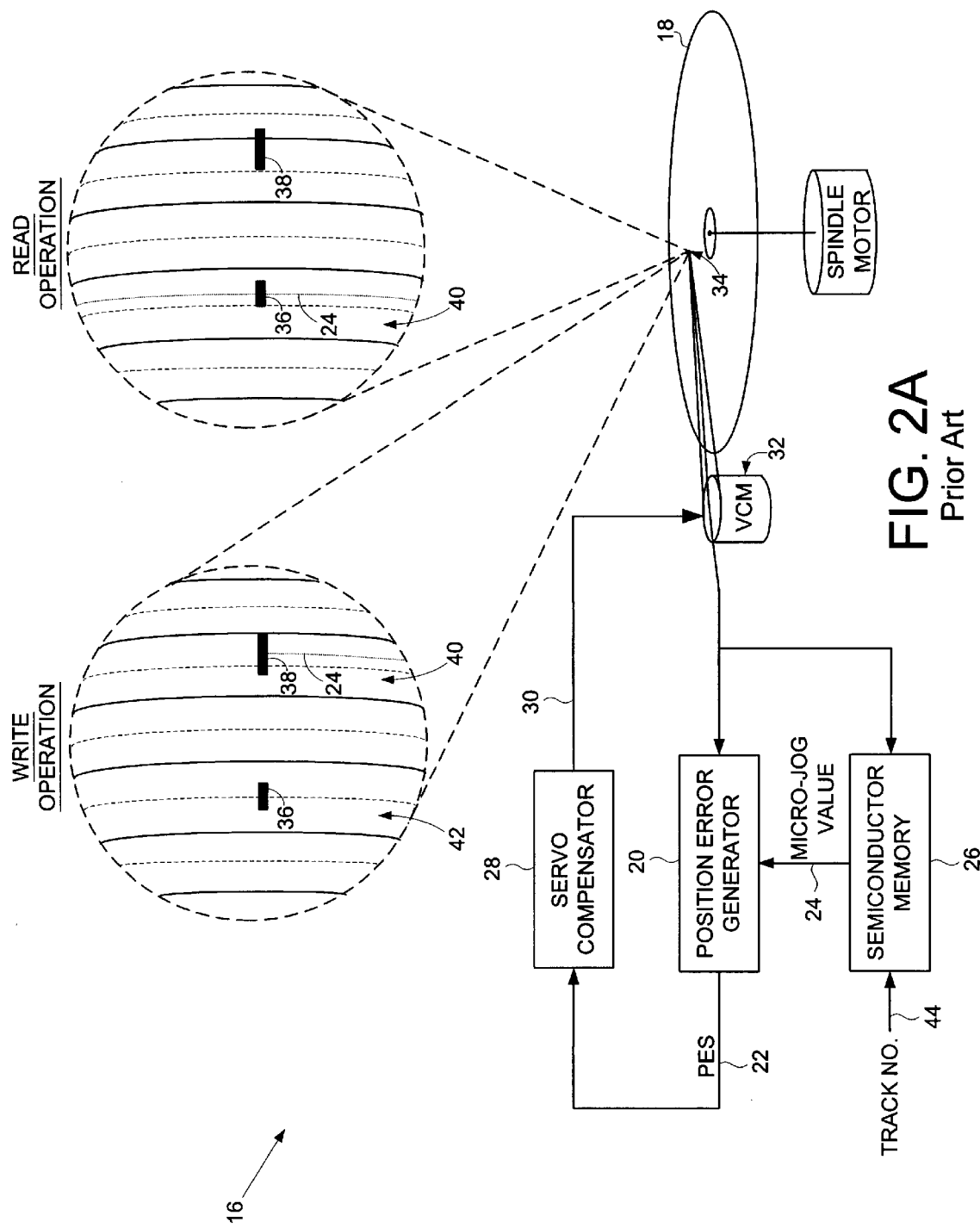
FIG. 2A shows a prior art disk drive wherein data track micro-jog values are written to a reserved track along a circumferential path which is offset from the reserved track's centerline.
Figure 2B:
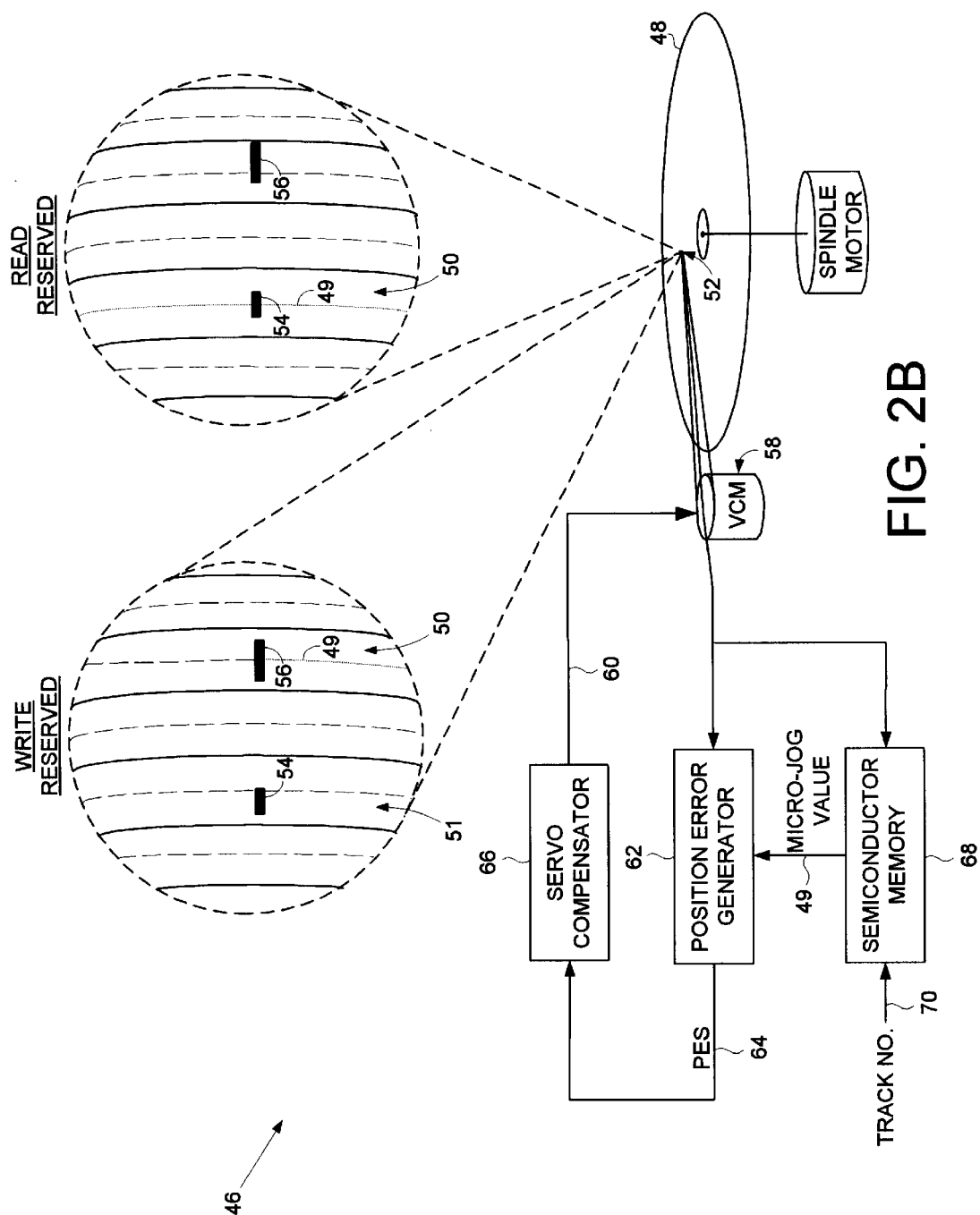
FIG. 2B shows a disk drive according to an embodiment of the present invention wherein data track micro-jog values are written along a centerline of a reserved track, thereby expediting the recovery of the data track micro-jog values during a power-on sequence.

FIG. 2B shows a disk drive 46 according to an embodiment of the present invention as comprising a disk 48 having a plurality of data tracks and at least one reserved track 50. Each of the data tracks and the at least one reserved track 50 comprise a plurality of embedded servo sectors. Each embedded servo sector comprises a plurality of servo bursts which define a centerline of each track. At least one of the data tracks for recording user data along a circumferential path offset from the centerline of the data track. The at least one reserved track 50 for, recording data track micro-jog values 49 along a circumferential path substantially aligned with the centerline of the reserved track 50. The disk drive further comprising a head 52 having a read element 54 and a write element 56, wherein the read element 54 is offset from the write element 56, and an actuator 58, responsive to a control signal 60, for actuating the head 52 radially over the disk 48. A position error generator 62 within the disk drive 46, responsive to the servo bursts recorded in the embedded servo sectors and the data track micro-jog values 49 recorded in the at least one reserved track 50, generates a position error signal (PES) 64 representing a position error of the read element 54 with respect to a circumferential path of data recorded in a selected one of the data tracks. A servo compensator 66, responsive to the PES 64, generates the control signal 60 applied to the actuator.

In one embodiment, the at least one reserved track 50 stores other data (e.g., read channel parameters) in addition to the data track micro-jog values 49.

During a power-on sequence the servo compensator 66 generates the control signal 60 to align the read element 54 over the centerline of the reserved track 50 in order to read the data track micro-jog values 49 recorded in the reserved track. The data track micro-jog values 49 are stored in a semiconductor memory 68. When writing user data to a selected one of the data tracks, the position error generator 62 generates the PES 64 to align the read element 54 along a centerline of a read track while the write element 56 writes data to the selected data track along a circumferential path that is offset from the centerline of the selected data track. The read track may be the same track as the write track, or it may be a different track. When reading data from the selected data track, the position error generator 62 uses at least one of the data track micro-jog values 49 corresponding to the selected data track to generate the PES 64 to align the read element 54 along the circumferential path of the data recorded in the selected data track. The track number 70 of the selected track is used to select the data track micro-jog value 49 from the semiconductor memory 68.

Figure 3A:
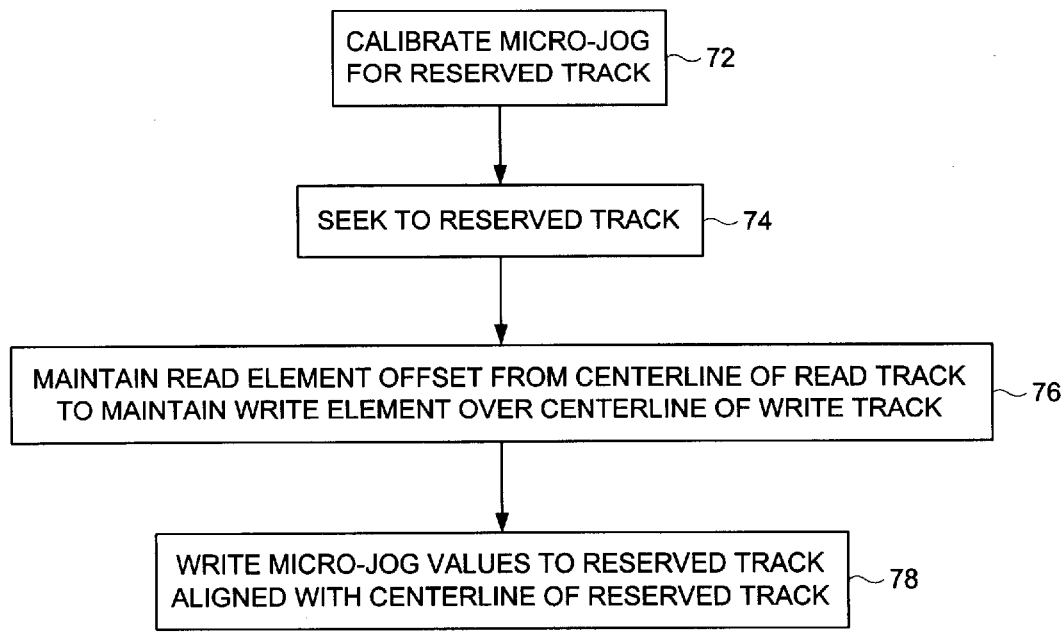
FIG. 3A shows a flow chart according to an embodiment of the present invention for writing the data track micro-jog values along a center line of a reserved track during manufacture of the disk drive.

FIG. 3A shows a flow chart according to an embodiment of the present invention for writing the data track micro-jog values 49 along the center line of the reserved track 50 during manufacture of the disk drive. At step 72, the disk drive calibrates a reserved track micro-jog value for use in writing the data track micro-jog values 49 to the reserved track 50. At step 74, the disk drive seeks the head 52 to the reserved track 50. At step 76, the disk drive uses the reserved track micro-jog value to maintain the read element 54 offset from a centerline of a read track 51 (FIG. 2B) in order to maintain the write element 56 over a centerline of the reserved track 50. At step 78, the disk drive writes the data track micro-jog values to the reserved track 50 substantially along the centerline of the reserved track 50.

Any suitable method may be employed to calibrate the reserved track micro-jog value at step 72. In one embodiment, a test pattern is iteratively written to and read from the reserved track 50 using a different reserved track micro-jog value. The read signal is evaluated to determine the reserved track micro-jog value which results in the test pattern being written substantially along the centerline of the reserved track 50.

Figure 3B:
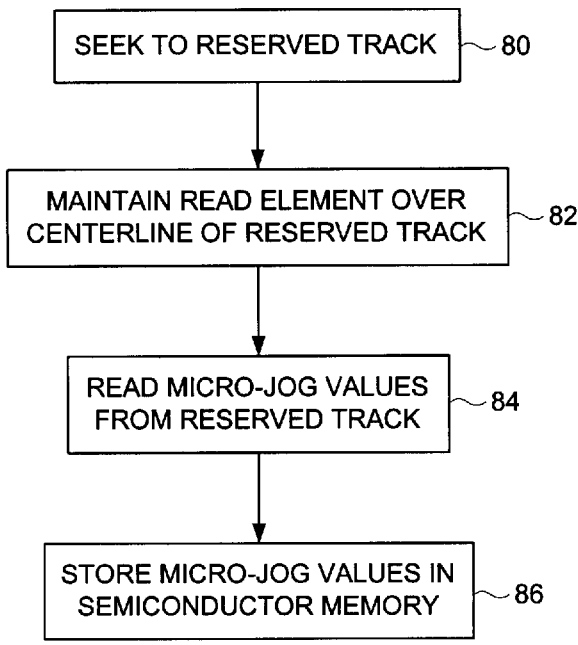
FIG. 3B shows a flow chart according to an embodiment of the present invention for reading the data track micro-jog values from the reserved track during a power-on sequence.

FIG. 3B shows a flow chart according to an embodiment of the present invention for reading the data track micro-jog values 49 from the reserved track 50 during a power-on sequence. At step 80, the disk drive seeks the head 52 to the reserved track 50. At step 82, the disk drive maintains the read element 54 over a centerline of the reserved track 50. At step 84, the read element 54 reads the data track micro-jog values 49 from the reserved track 50, and at step 86, the data track micro-jog values 49 are stored in the semiconductor memory 68.

Figure 3C:
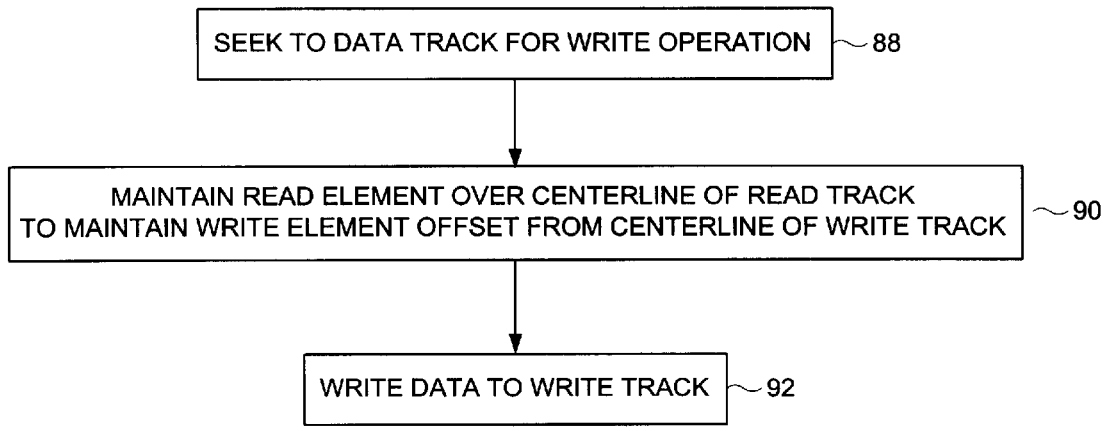
FIG. 3C shows a flow chart according to an embodiment of the present invention wherein the read element of the head is maintained over a centerline of a read track while the write element of the head writes user data to a selected data track offset from the data track's centerline.

FIG. 3C shows a flow chart according to an embodiment of the present invention wherein the read element 54 of the head 52 is maintained over a centerline of a read track while the write element 56 of the head 52 writes user data to a selected data track offset from the data track's centerline. At step 88 the disk drive seeks the head 52 to the selected data track. At step 90, the disk drive maintains the read element 54 over a centerline of a read track to maintain the write element 56 offset from a centerline of the selected data track. At step 92, the write element 56 writes the user data to the selected track. The read track may be the same track as the selected data track, or it may be a different data track, depending on the radial location of the head 52.

Figure 3D:
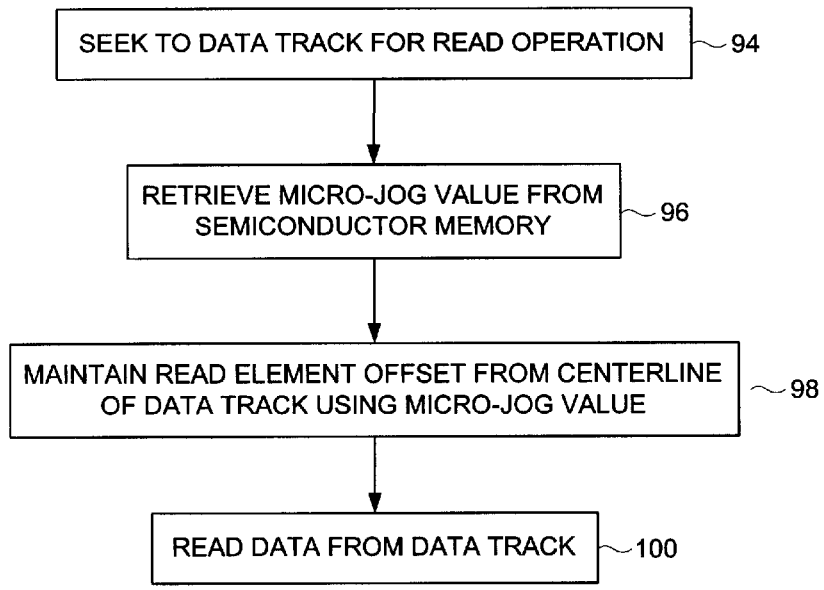
FIG. 3D shows a flow chart according to an embodiment of the present invention wherein at least one of the micro-jog values stored in the semiconductor memory is used to maintain the read element of the head over a circumferential path offset from a centerline of a data track in order to read user data recorded in the data track.

FIG. 3D shows a flow chart according to an embodiment of the present invention wherein at least one of the micro-jog values 49 stored in the semiconductor memory 68 is used to maintain the read element 54 of the head 52 over a circumferential path offset from a centerline of the selected data track in order to read user data recorded in the selected data track. At step 94, the disk drive seeks the head 52 to the selected data track. At step 96, the disk drive retrieves the data track micro-jog value 49 from the semiconductor memory 68 corresponding to the selected data track. At step 98, the disk drive uses the selected data track micro-jog value 49 to maintain the read element 54 along a circumferential path corresponding to the data recorded in the selected data track. At step 100, data is read from the selected data track.

Recording the data track micro-jog values 49 along the centerline of the reserved track 50 facilitates recovering the data track micro-jog values 49 during the power on sequence since it is not necessary for the disk drive to converge on a micro-jog value for the reserved track 50 as with the prior art disk drive 16 of FIG. 2A. With the data track micro-jog values 49 recorded along the centerline of the reserved track 50, a micro-jog value should not be necessary to read the reserved track 50 (unless the reserved track 50 is marginally recorded and introducing a micro-jog value is part of the disk drive's normal retry procedure).

I claim:

1. In a disk drive comprising a disk having a plurality of data tracks and at least one reserved track, and a head comprising a read element offset from a write element, a method of recording data track micro-jog values in the reserved track, the method comprising the steps of:

(a) calibrating a reserved track micro-jog value;

(b) seeking the head to the reserved track;

(c) using the reserved track micro-jog value to maintain the read element offset from a centerline of a read track in order to maintain the write element over a centerline of the reserved track; and (d) writing the data track micro-jog values to the reserved track substantially along the centerline of the reserved track.

2. In a disk drive comprising a disk having a plurality of data tracks and at least one reserved track, and a head comprising a read element offset from a write element, a method of reading data track micro-jog values recorded in the reserved track, the data track micro-jog values used to compensate for the offset between the read element and the write element, the method comprising the steps of:

(a) seeking the head to the reserved track;

(b) maintaining the read element over a centerline of the reserved track;

(c) reading the data track micro-jog values recorded in the reserved track;

(d) storing the data track micro-jog values in a semiconductor memory; and (a) seeking the head to a selected one of the data tracks;

(b) maintaining the read element over a centerline of a read track to maintain the write element offset from a centerline of the selected data track; and (c) writing user data to the selected data track.

3. The method of claim 2, wherein the read track is not the selected data track.

4. The method of claim 2, further comprising the steps of:

(a) seeking the head to the selected data track;

(b) selecting at least one of the data track micro-jog values stored in the semiconductor memory corresponding to the selected data track;

(c) using the selected data track micro-jog value to maintain the read element along a circumferential path corresponding to the data recorded in the selected data track; and (d) reading data from the selected data track.

* * * * *